(12) United States Patent
Yoshino et al.

(10) Patent No.: US 11,068,180 B2
(45) Date of Patent: Jul. 20, 2021

(54) SYSTEM INCLUDING NON-VOLATILE MEMORY DRIVE

(71) Applicant: HITACHI, LTD., Tokyo (JP)

(72) Inventors: Yukihiro Yoshino, Tokyo (JP); Junji Ogawa, Tokyo (JP); Go Uehara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 119 days.

(21) Appl. No.: 16/564,115

(22) Filed: Sep. 9, 2019

(65) Prior Publication Data

US 2020/0192573 A1 Jun. 18, 2020

(30) Foreign Application Priority Data

Dec. 13, 2018 (JP) .............................. JP2018-233912

(51) Int. Cl.
*G06F 12/00* (2006.01)
*G06F 13/00* (2006.01)
*G06F 13/28* (2006.01)
*G06F 3/06* (2006.01)
*G06F 12/02* (2006.01)

(52) U.S. Cl.
CPC ............ *G06F 3/064* (2013.01); *G06F 3/0614* (2013.01); *G06F 3/0652* (2013.01); *G06F 3/0688* (2013.01); *G06F 12/0246* (2013.01); *G06F 2212/7201* (2013.01)

(58) Field of Classification Search
CPC ... G06F 3/0614; G06F 3/0688; G06F 12/0246
USPC ......................................................... 711/114
See application file for complete search history.

(56) References Cited

U.S. PATENT DOCUMENTS

| 2007/0233949 | A1* | 10/2007 | Hart | G06F 3/064 711/114 |
| 2008/0046649 | A1* | 2/2008 | Ito | G11C 16/349 711/115 |
| 2009/0327604 | A1* | 12/2009 | Sato | G06F 3/0614 711/114 |
| 2011/0066793 | A1* | 3/2011 | Burd | G11C 29/52 711/103 |
| 2013/0318283 | A1 | 11/2013 | Small et al. | |

(Continued)

FOREIGN PATENT DOCUMENTS

JP 2015-518987 A 7/2015

*Primary Examiner* — Edward J Dudek, Jr.
*Assistant Examiner* — Sidney Li
(74) *Attorney, Agent, or Firm* — Volpe Koenig

(57) ABSTRACT

A higher-level system that inputs and outputs data to/from a storage area including one or more logical areas respectively provided from one or more NVM drives manages the storage area, and manages a plurality of chunks that are a plurality of areas forming the storage area, each of the chunks being a unit of data input/output and being an non-overwritable area. Each of the plurality of chunks has the same chunk size, and each of the plurality of chunks includes a part of each of one or more logical areas. Each of the plurality of chunks includes, for each of the one or more NVM drives, all or part of one or more logical blocks that are one or more ranges corresponding to one or more physical blocks, respectively, but does not include at least a part of a logical block that is entirely or partially included in another chunk.

4 Claims, 16 Drawing Sheets

(56) References Cited

U.S. PATENT DOCUMENTS

2017/0192696 A1\* 7/2017 Floeder ................ G06F 3/0644
2018/0152505 A1\* 5/2018 Averett ............... H04L 67/1097

\* cited by examiner

FIG. 8

POOL MANAGEMENT TABLE
611

| POOL# 801 | RG# 802 | CHUNK# 803 | STATUS 804 | ALLOCATION DESTINATION 805 |
|---|---|---|---|---|
| 0 | 0 | 000 | INVALIDATED | - |
| | | 001 | VALIDATED | VOL#1, LBA#051 |
| | | 002 | VACANT | - |
| | | ... | ... | ... |
| 1 | 1 | 010 | VACANT | - |
| | | ... | ... | ... |
| | 2 | 020 | VACANT | - |
| | | ... | ... | ... |
| ... | ... | ... | ... | ... |

FIG. 9

CHUNK MANAGEMENT TABLE
612

| RG# | POOL# | DRIVE# | BS | Lcm_B | n | α | CS | PS | c |
|---|---|---|---|---|---|---|---|---|---|
| 0 | 0 | 0 | 20MB | 100MB | 4 | 2 | 800MB | 12TB | 25000 |
|   |   | 1 | 50MB |   |   |   |   | 10TB |   |
| 1 |   | 2 | 20MB |   |   |   |   | 10TB | 25000 |
|   |   | 3 | 10MB |   |   |   |   | 11TB |   |
| 2 | 1 | 4 | 40MB | 120MB | 6 | 1 | 720MB | 10TB | 27777 |
|   |   | 5 | 20MB |   |   |   |   | 10TB |   |
| 3 |   | 6 | 20MB |   |   |   |   | 10TB | 55555 |
|   |   | 7 | 20MB |   |   |   |   | 10TB |   |
|   |   | 8 | 60MB |   |   |   |   | 10TB |   |
|   |   | 9 | 30MB |   |   |   |   | 20TB |   |
| ... | ... | ... | ... | ... | ... | ... | ... | ... | ... |

FIG. 10

FM-SIZE MANAGEMENT TABLE
711

| BS | PS | LS |
|---|---|---|
| 210MB | 10TB | 6TB |

SYSTEM INCLUDING NON-VOLATILE MEMORY DRIVE

CROSS-REFERENCE TO PRIOR APPLICATION

This application relates to and claims the benefit of priority from Japanese Patent Application number 2018-233912, filed on Dec. 13, 2018 the entire disclosure of which is incorporated herein by reference.

BACKGROUND

The present invention generally relates to a storage control in a system including a non-volatile memory drive.

As an NVM drive including an NVM (Non-Volatile Memory), for example, an FM drive (for example, an SSD (Solid State Drive)) equipped with an NAND-type flash memory (hereinafter, referred as an FM) is known. The FM includes a plurality of physical blocks which are units of data erasure, respectively. The physical blocks include physical pages which are units of data I/O (Input/Output), respectively. Each of the physical pages is a non-overwritable area. Therefore, each of the physical blocks is an additional write area (log-structured area). For this reason, it is necessary to erase data from the physical block in order to newly write data to a data-filled physical block.

Patent Literature 1 discloses in which data is written to a non-volatile solid state storage apparatus in units of write units and the size of the write unit is an integral multiple of the size of an erase block in the non-volatile solid state storage apparatus.

Patent Literature 1: National Publication of International Patent Application No. 2015-518987

SUMMARY

FM drives generally require a reclamation process. The reclamation process is a process of reading valid data from each of one or more physical blocks, moving the read data to a physical block (for example, a physical block having the number of times of erasure smaller than that of a physical block of a movement source, and executing an erasure process on the physical block of the movement source. Vacant physical blocks can be increased by the reclamation process.

In order to be capable of performing the reclamation process, a physical area based on the plurality of physical blocks forming an FM in an FM drive includes, in general, not only a user area which is an area being open to the higher-level system but also a spare area (over-provisioning area) which is an area not being open to the higher-level system. The physical block belonging to the spare area is generally a physical block that can be used as a movement destination in the reclamation process, or an unusable physical block that stores invalid data.

For this reason, the amount of data actually stored in the FM drive is limited to be equal to or smaller than a capacity (that is, a user capacity which is a capacity of a user area) obtained by subtracting a spare capacity, which is a capacity of a spare area, from a physical capacity which is a capacity of a physical area. Therefore, bit costs are low.

NVMs other than the FM may also have these types of problems.

A higher-level system that inputs and outputs data to/from a storage area including one or more logical areas respectively provided from the one or more NVM drives manages a plurality of chunks that are a plurality of areas forming the storage area, each of the chunks being a unit of data input/output and being an non-overwritable area. Each of the plurality of chunks has the same chunk size, and each of the plurality of chunks includes a part of each of one or more logical areas. Each of the plurality of chunks includes, for each of the one or more NVM drives, all or part of one or more logical blocks that are one or more ranges corresponding to one or more physical blocks, respectively, but does not include at least a part of a logical block that is entirely or partially included in any another chunk.

Thus, bit costs of the NVM drive are improved.

BRIEF DESCRIPTION OF THE DRAWINGS

FIG. 8 illustrates a configuration of a pool management table;
FIG. 9 illustrates a configuration of a chunk management table;
FIG. 10 illustrates a configuration of an FM-size management table.

DESCRIPTION OF EMBODIMENTS

Figure 1:
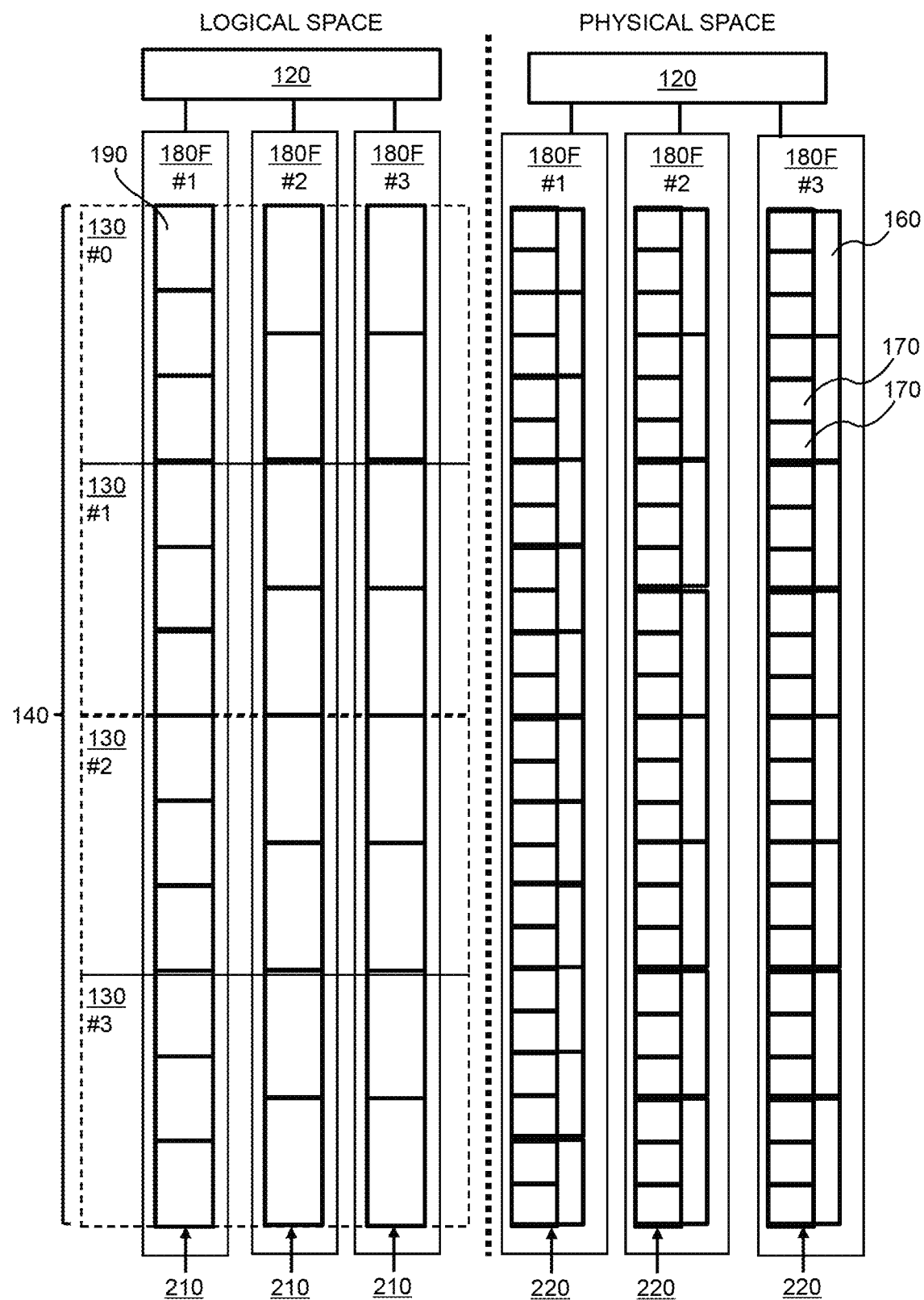
FIG. 1 illustrates an outline of a first embodiment.

In the following description, an "interface apparatus" may be one or more interface devices. The one or more interface devices may be at least one of the following:

One or more I/O (Input/Output) interface devices: An I/O (Input/Output) interface device is an interface device for at least one of an I/O device and a remote display computer. The I/O interface device for the display computer may be a communication interface device. At least one I/O device may be any of user interface devices, for example, input devices such as a keyboard and a pointing device and output devices such as display devices.

One or more communication interface devices: One or more communication interface devices may be the same type of one or more communication interface devices (for example, one or more NICs (Network Interface Cards) or may be different types of two or more communication interface devices (for example, NIC and HBA (Host Bus Adapter)).

In the following description, a "memory" may be a memory different from NVM in an NVM drive, one or more memory devices, and a main storage device, typically. At least one memory device in the memory may be a volatile memory device or may be a non-volatile memory device.

In the following description, a "permanent storage device" is typically a non-volatile storage device (for example, an auxiliary storage device), and specifically, is at least an NVM drive of HDD (Hard Disk Drive) and NVM drives, for example.

In the following description, a "processor" is one or more processor devices. At least one processor device is typically a microprocessor device such as a CPU (Central Processing Unit), but may be another type of processor device such as a GPU (Graphics Processing Unit). At least one processor device may be a single core processor or may be a multicore processor. At least one processor device may be a processor core. At least one processor device may be, in a broad sense, a hardware circuit (for example, an FPGA (Field-Programmable Gate Array) or an ASIC (Application Specific Integrated Circuit) that performs a part of or all of a process.

In the following description, an expression such as an "xxx table" describes information from which an output for an input can be obtained, but the information may be any data structure or may be a learning model such a neural network that generates an output for an input. Therefore, the "xxx table" can be called "xxx information". In the following description, the configuration of each table is an example, and one table may be divided into two or more tables or a part or all of two or more tables may be one table.

In addition, while a "program" is sometimes used as a subject when describing a process in the following description, since a program causes a prescribed process to be performed by appropriately using a storage apparatus and/or an interface apparatus and the like when the program is executed by a processor, a "processor" (or a device such as a controller with its processor) may be used as a subject of a process. A program may be installed in an apparatus such as a computer from a program source. The program source may be, for example, a program distribution server or a recording medium (for example, a non-transitory recording medium) that can be read by a computer. In the following description, two or more programs may be realized as one program or one program may be realized as two or more programs.

In the following description, the "storage system" includes one or more physical storage apparatuses. At least one physical storage apparatus may be a general-purpose physical computer. At least one physical storage apparatus may execute a virtual computer (for example, VM (Virtual Machine)) or may execute software for realizing SDx (Software-Defined anything). As the SDx, for example, SDS (Software Defined Storage) (an example of a virtual storage apparatus) or SDDC (Software-defined Datacenter) can be adopted.

In the following description, in a case of description without discrimination between the same types of elements, a reference number (for example, FM drive 180F) of the element or a common part (for example, permanent storage device 180) in a reference number may be used. In a case of description with discrimination between the same types of elements, an ID of the element may be added to the end of the reference number (for example, FM drive 180E-1 or FM drive 180E-2) or the reference number of the element (for example, FM drive 180F or HDD 180H) may be used.

In the following description, numbers are used as IDs (identification information), but other types of information (for example, names) may be used instead of or in addition to numbers.

Several embodiments of the present invention will be described below with reference to the drawings. In the following embodiments, an FM (specifically, NAND-type flash memory) is adopted as an example of an NVM. Therefore, an FM drive is adopted as an example of the NVM drive, but the present invention is also applicable to a case where a memory element other than the FM is provided. In order to avoid confusion in the following description, a request for the storage system may be referred to as a "request", a request for the FM drive may be referred to as an "order", and a request for the FM may be referred to as an "order".

First Embodiment

FIG. 1 illustrates an outline of a first embodiment.

In the first embodiment, a storage system is employed as a system including one or more FM drives 180F and a higher-level system of one or more FM drives 180F. For this reason, an example of the higher-level system includes a storage controller 120 that inputs and outputs data to/from one or more FM drives 180F. Each of the FM drives 180F includes an FM as a physical area 220 including a plurality of physical blocks 160. Each of the physical blocks 160 includes a plurality of physical pages 170. The physical block 160 is a unit of erasure, and the physical page 170 is a unit of I/O.

Data movement processing such as reclamation process is unnecessary in the FM drive 180F, and as a result, a spare area in the FM drive 180F is open, that is, the following (x) or (y) is adopted.

(x) A logical capacity of the FM drive 180F (capacity of a logical area 210 provided by the FM drive 180F) is based on a spare capacity (capacity of the spare area) in addition to a user capacity (capacity of the user area). In order words, not only the user area but also spare area is also open to the storage controller 120, which is an example of the higher-level system of the FM drive 180F.

(y) The spare capacity of the FM drive 180F is zero. That is, the FM drive 180F does not have the spare area, and the entire physical area 220 of the FM drive 180F is a user area.

One or more logical areas 210 are provided to the storage controller 120 from one or more FM drives 180F, respectively. For each of the FM drives 180F, the logical area 210 corresponds to a continuous logical address range (space). The logical address is an LBA (Logical Block Address), for example. The storage controller 120 manages a storage area 140 including one or more logical areas 210, and manages a plurality of chunks 130 that are a plurality of areas forming the storage area 140, each of the chunks being a unit of data input/output and being an non-overwritable area. Sizes of the plurality of chunks 130 are the same, respectively. Each of the plurality of chunks 130 includes a part of each of one or more logical areas 210. Each of the plurality of chunks 130 includes, for each of one or more FM drives 180F, all or part of one or more logical blocks 190 that are one or more ranges corresponding to one or more physical blocks 160, respectively, but does not include at least a part of the logical block 190 that is entirely or partially included in any another chunk (details regarding "or part" herein will be described in a second embodiment).

Thus, when data in the storage area 140 is updated, the updated data is written to a second chunk (for example, the next chunk 130-1) different from a first chunk (for example, a chunk 130-0) in which the data is stored. As a result, all the data in all the physical blocks 160, which is the basis of the first chunk storing the data before update, become invalid data, and all data in all the physical blocks 160, which is the basis of the second chunk storing the updated data, become valid data. That is, it is not necessary to move valid data between the physical blocks 160 in any FM drive 180F which is the basis of the storage area 140. In other words, when the storage controller 120 performs data relocation between the chunks 130, a plurality of chunks 130 are configured so that data relocation between the physical blocks 160 is completed in a subordinate FM drive 180. Therefore, it is possible to realize a logical capacity based on not only the user capacity but also the spare capacity, or to make the spare capacity zero. For this reason, as illustrated in FIG. 1, the logical area 210 having a logical capacity equal to a physical capacity (for example, a physical capacity including a spare capacity in addition to a user capacity or having a zero spare capacity) that is a capacity of the physical area 220 is formed in each of the FM drives 180F, and as a result, bit costs of the NVM drive are improved.

The chunk size is based on sizes of the plurality of physical blocks respectively corresponding to the plurality of FM drives 180F. Specifically, for example, the sizes of the physical blocks are not necessarily identical to each other in the plurality of FM drives 180 (for example, the size of the physical block in the FM drive 180E-1 is smaller than the sizes of the physical blocks in the FM drives 180E-2 and 180E-3), and the chunk size is N (N is a natural number) times the product of the least common multiple of the sizes of the plurality of physical blocks and the number of NVM drives. Thus, for any FM drive 180F that is the basis of the storage area 140, a logical block 190 in a range corresponding to the same physical block 160 in the logical area 210 is not shared from two or more different chunks 130. For this reason, even when data relocation is performed between the chunks 130 by the storage controller 120 in order to update the data in the chunk 130, mixing of valid data and invalid data can be avoided both in the physical block 160 that is the basis of the chunk 130 of the relocation source and the physical block 160 that is the basis of the chunk 130 of the relocation destination (that is, occurrence of a situation requiring the reclamation process can be avoided).

The above-described Patent Literature 1 does not disclose or suggest not only the open of the spare area and the management of the non-overwritable chunk but also the storage area 140 extending over the plurality of FM drives 180F.

Figure 2:
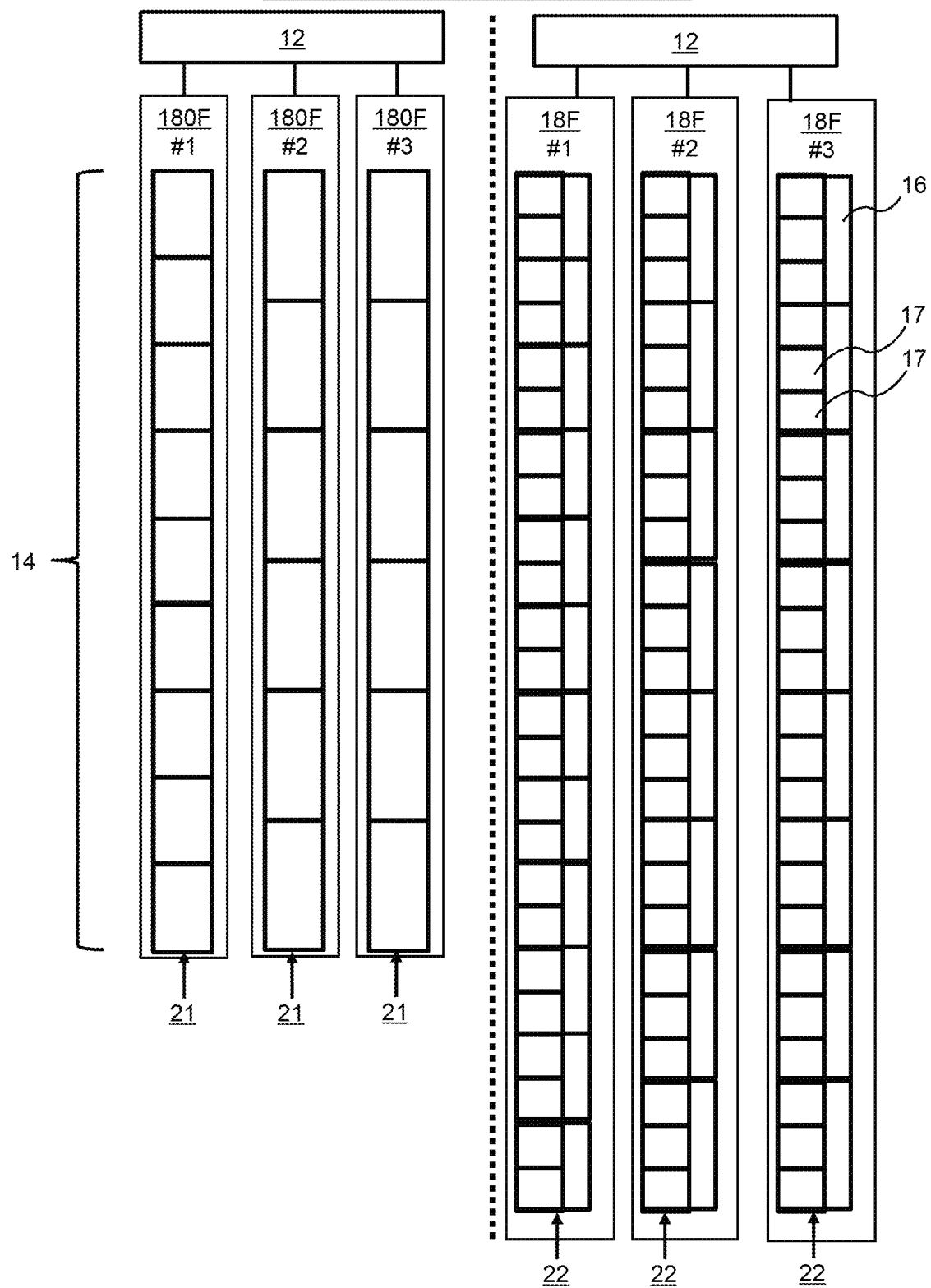
FIG. 2 illustrates a comparative example of the first embodiment.

Therefore, according to the comparative example illustrated in FIG. 2, each of the FM drives 18F requires a spare area that can hardly be open to the higher-level system such as a storage controller 12. For this reason, the capacity of the logical area 21 provided for each of the FM drives 18F is smaller than the physical capacity (capacity of the physical area 22), specifically, a capacity obtained by subtracting the spare capacity from the physical capacity. As a result, the capacity of the storage area 14 is small, and bit costs are low.

Further, when the chunk is not managed as being non-overwritable or the sizes of the plurality of physical blocks respectively corresponding to the plurality of FM drives 18F are not considered, valid data and invalid data (physical page 17 storing valid data and physical page 17 storing invalid data) are mixed in the physical block 16 that is the basis of the storage area 14, and as a result, a reclamation process is necessary. For this reason, according to the comparative example, the spare area is necessary, and, unlike the present embodiment, the spare area can hardly be open.

The present embodiment will be described below in detail. In the present embodiment, it is assumed that the storage area 140 is an additional write area (thus, a plurality of chunks 130 are used sequentially). The "logical block" may include a plurality of logical pages respectively corresponding to the plurality of physical pages forming the physical block corresponding to the logical block. For each of the logical addresses (for example, each of the logical pages), the "valid data" refers to the latest data for a certain logical address, and the "invalid data" refers to data before update in which the valid data is updated data. A physical page storing the valid data may be referred to as "valid page", and a page storing "invalid data" may be referred to as "invalid page".

Figure 3:
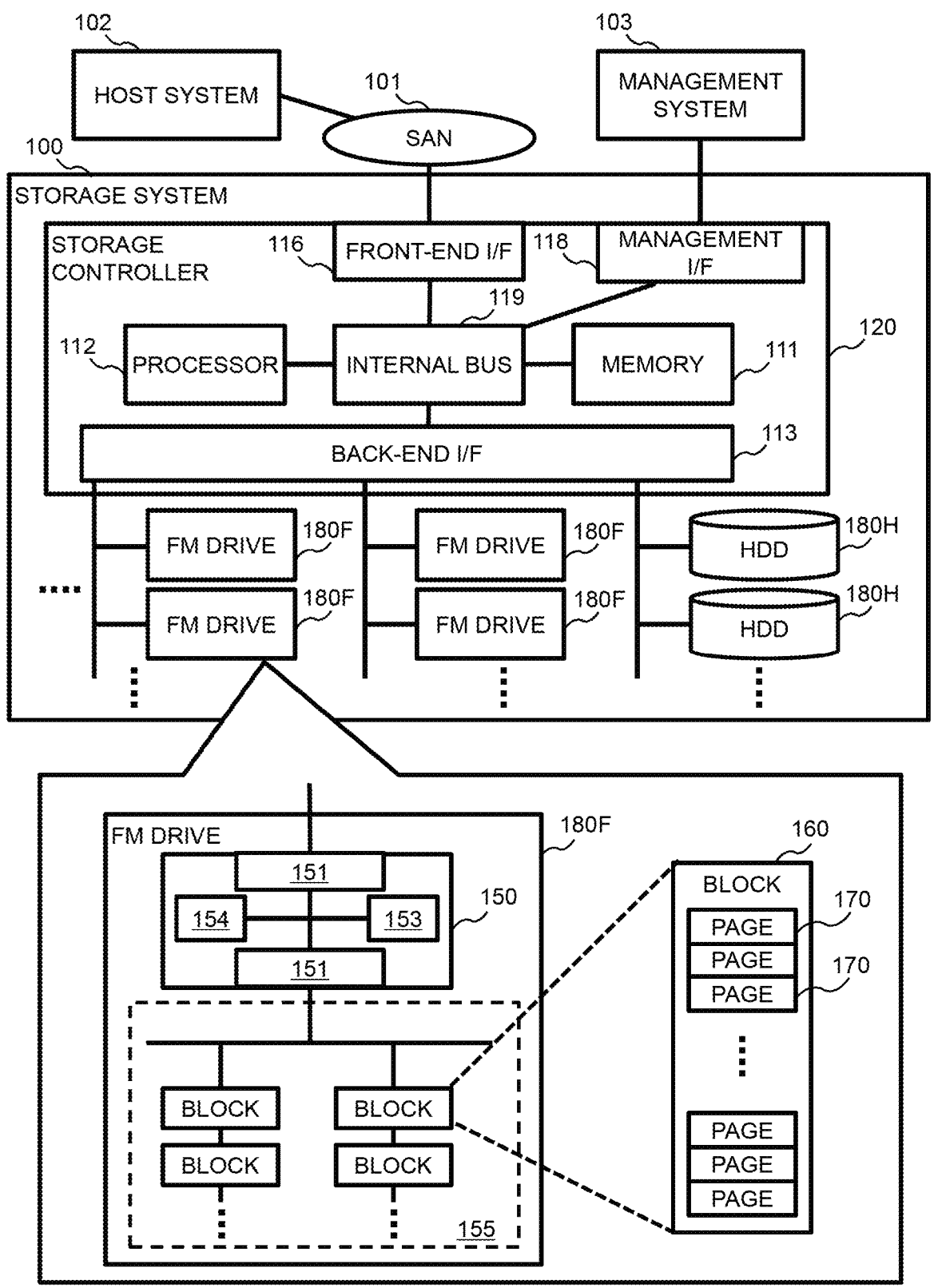
FIG. 3 illustrates an entire configuration of a system including a storage system according to the first embodiment.

FIG. 3 illustrates an entire configuration of a system including the storage system according to the first embodiment.

A storage system 100 is coupled to one or more host systems 102 via a first communication network such as SAN (Storage Area Network) 101. The storage system 100 is coupled to a management system 103 via a second communication network (not illustrated). In the present embodiment, each of the host system 102 and the management system 103 is a physical computer including a processor and a memory, but may be a system implemented by executing predetermined software with a physical computer. The host system 102 transmits an I/O request to the storage system 100. The management system 103 is a system that manages the storage system 100. The first communication network and the second communication network may be different from each other or be identical to each other.

The storage system 100 includes a plurality of permanent storage devices 180 and a storage controller 120 that inputs and outputs data to/from the plurality of permanent storage devices 180. The plurality of permanent storage devices 180 includes a plurality of FM drives 180F, and may further include another type of permanent storage device, for example, a plurality of HDDs 180H.

The storage controller 120 includes a front-end I/F (interface device) 116, a back-end I/F 113, a management I/F 118, a memory 111, a processor 112, and an internal bus 119 coupled thereto. The front-end I/F 116, the back-end I/F 113, and the management I/F 118 are examples of interface apparatuses.

The front-end I/F 116 is an interface device that is used to couple the storage system 100 and the SAN 101 to each other, and transfers requests and data via the SAN 101 using a protocol such as Ethernet (registered trademark) or FC (Fibre Channel).

The back-end I/F 113 is an interface device that is used to couple with the permanent storage device 180, and transfers various orders and data using a protocol such as SAS (Serial Attached SCSI) or FC.

The management I/F 118 is an interface device that is used to couple with the management system 103, and transfers various request and data using a protocol such as TCP/IP.

The memory 111 is a component that stores programs and temporarily stores data, and temporarily stores data, which is received from the host system 102, as a write cache.

The processor 112 is a component that controls the storage system 100, and controls the transfer of various types of data in the storage system 100 by executing programs in the memory 111.

The FM drive 180F includes an FM mounted therein, and writes data to the FM or reads data from the FM in response to an order from the higher-level system (here, the storage controller 120).

The FM drive 180F includes an FM 155 and an FM controller 150 that controls input and output of data to/from the FM 155.

The FM 155 may include one or more FM chips. The FM chip includes a plurality of physical blocks 160, and each of the physical blocks 160 includes a plurality of physical pages 170. Data I/O (write and read) is performed in units of physical pages, and data is erased in units of physical blocks.

The FM controller 150 includes an I/F 151 coupled to a higher-level system such as the storage controller 120, an I/F 152 coupled to the FM 155, a memory 153, and a processor 154 coupled to the I/F 151, the I/F 152, and the memory 153. The processor 154 provides the logical area 210 to the storage controller 120. The logical area 210 may be paraphrased as a logical address range. The processor 154 manages a correlation between a logical address and a physical address (for example, the memory 153 stores an address conversion table (to be described below) indicating the correlation between the logical address and the physical address). The processor 154 specifies the physical page 170 to which the physical address corresponding to the logical address specified by the I/O order from the storage controller 120 belongs, and performs an I/O on the specified physical page 170. The logical address is, for example, an LBA (Logical Block Address), but may include a logical block number or a logical page number instead of or in addition to the LBA. The physical address is, for example, a PBA (Physical Block Address), but may include a physical block number or a physical page number instead of or in addition to the PBA.

Figure 4:
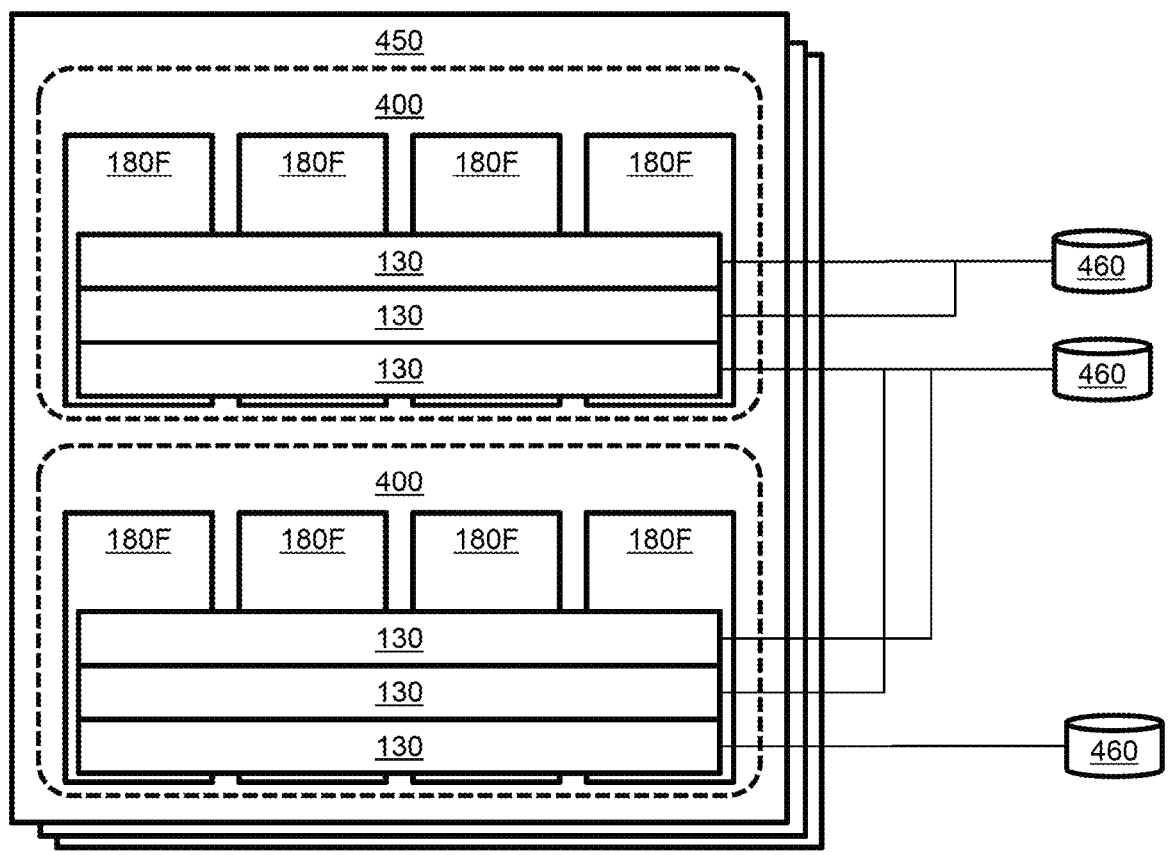
FIG. 4 illustrates a storage management in the storage system.

FIG. 4 illustrates storage management in the storage system 100.

There are a plurality of RAID (Redundant Array of Independent (or Inexpensive) Disks) groups 400. Each of the RAID groups 400 includes a plurality of FM drives 180F. The storage controller 120 manages the storage area 140 based on the RAID group 400 for each RAID group 400. Therefore, for each RAID group 400, the storage area 140 based on the RAID group 400 is partitioned into a plurality of chunks 130. In each RAID group 400, each of the chunks 130 is provided across the plurality of FM drives 180F forming the RAID group 400, and thus may correspond to one or more stripes. The "stripe" indicates a storage area portion formed by a plurality of strips (for example, multiple strips with the same logical address) respectively present in the plurality of logical areas 210 (plurality of logical areas 210 provided by the respective plurality of FM drives 180F) forming the storage area 140 (herein, redundant configuration area). For each logical area 210, the "strip" indicates a part of the logical area 210.

One or more virtual pools 450 are managed by the storage controller 120. One or more RAID groups 400 belong to the virtual pool 450. In other words, each of the plurality of RAID groups 400 belongs to any one of the virtual pools 450.

The storage controller 120 provides one or more logical volumes 460 to the host system 102. Each of the logical volumes 460 is a virtual logical volume, for example, a logical volume according to the Thin Provisioning technology. When the storage controller 120 receives a write request for specifying the logical volume 460, the chunks 130 are allocated to a range including an area according to a write destination address (logical address specified by the write request) of the logical volume. The chunk sizes are identical to each other for each virtual pool 450 (that is, the sizes of all the chunks 130 existing in one virtual pool 450 are identical to each other). The reason is that, in the present embodiment, the virtual pool 450 is associated with the logical volume 460, and the chunks 130 are allocated to the logical volume 460 from the virtual pool 450 associated with the logical volume 460.

Figure 5:
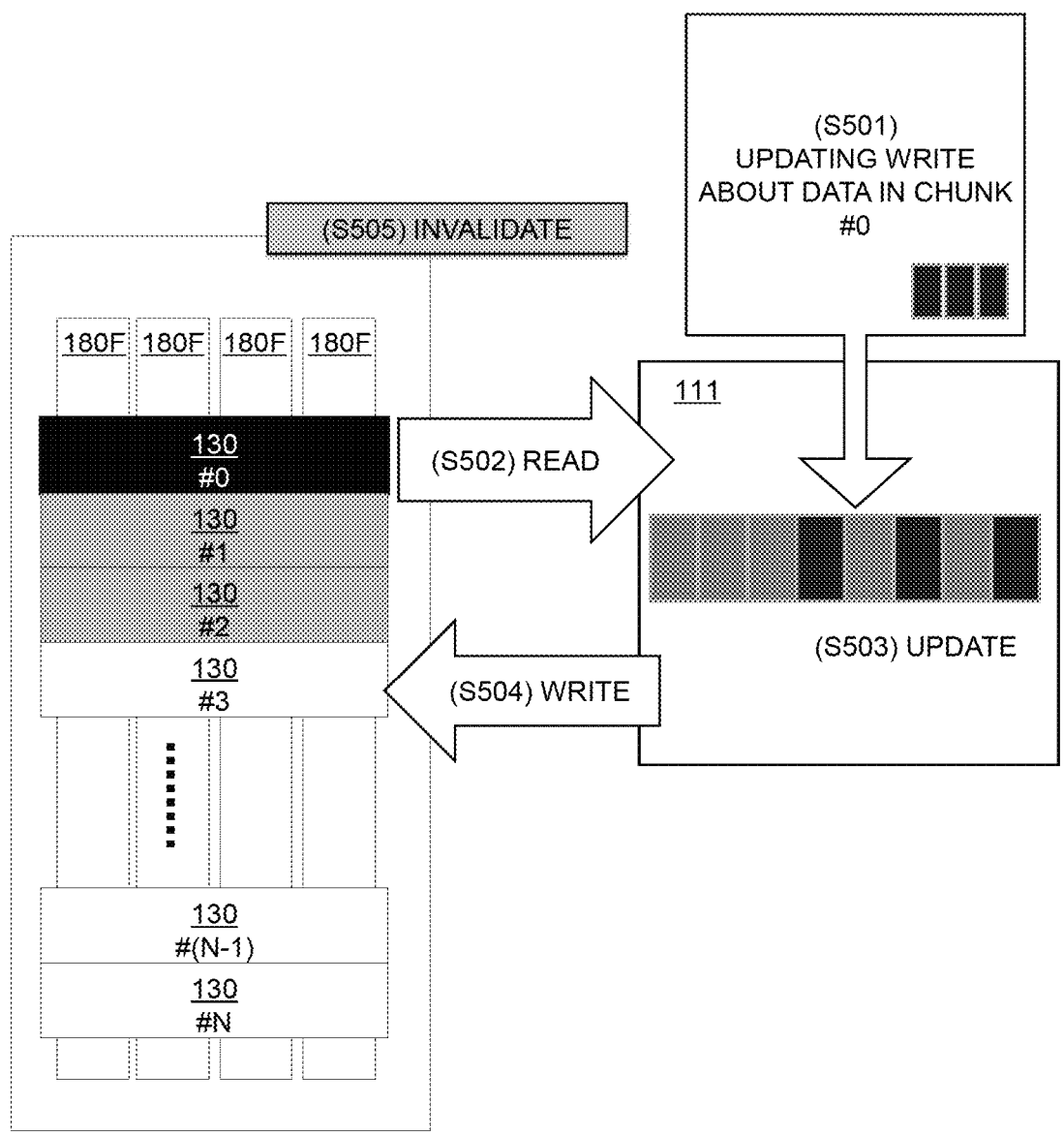
FIG. 5 illustrates schematically an example of updating a storage area.

FIG. 5 schematically illustrates an example of updating of the storage area 140. In the description with reference to FIG. 5, data in units of chunks is particularly referred to as "chunk data".

The chunk 130 is a unit of a data input/output with respect to the storage area 140 managed as an additional write area.

It is assumed that a chunk 130-1, a chunk 130-2, . . . , a chunk 130-(N−1), and a chunk 130-N are arranged from top to bottom. It is assumed that data is stored in chunks 130-0 to 130-2 (in other words, each of the chunks 130-0 to 130-2 are already allocated to one of the logical volumes 460), and the following chunks including the chunk 130-3 are in a vacant state. The storage controller 120 manages the correlation between the logical address of the logical volume 460 and the logical address of the chunk 130 and the logical address of the vacant chunk 130.

Herein, it is assumed that the storage controller 120 receives a write request that requires an update on chunk data stored in the chunk 130-0 (S501). In this case, the storage controller 120 reads the chunk data from the chunk 130-0 to the memory 111 (S502), and overwrites the chunk data with data according to the received write request (S503). The storage controller 120 writes the overwritten (updated) chunk data to the top vacant chunk 130-3 (S504), and invalidates the chunk 130-0 before update (S505).

When storage controller 120 newly receives a write request, which requires an update on chunk data of the chunk 130-0, while the overwritten chunk data is stored in the memory 111, the storage controller 120 may overwrite the overwritten chunk data on the memory 111 with data according to the newly received write request before the overwritten chunk data is written to the vacant chunk 130-3. In other words, a so-called read-modify-write in units of chunks is not necessary to be performed at each time of overwriting (updating), and after the same chunk data is overwritten twice or more, the last overwritten chunk data may be written to the vacant chunk.

Further, the chunk group (one or more continuous or discrete chunks 130) may be a unit of erasure. Specifically, for example, the storage controller 120 may erase data in units of chunks from the invalidated chunk 130-0. Thereby, the vacant chunk 130 can be increased. In addition, when the data is erased from the chunk 130-0, data erasure in units of physical blocks is performed on each of all physical blocks corresponding to all logical blocks included in the chunk 130-0.

Figure 6:
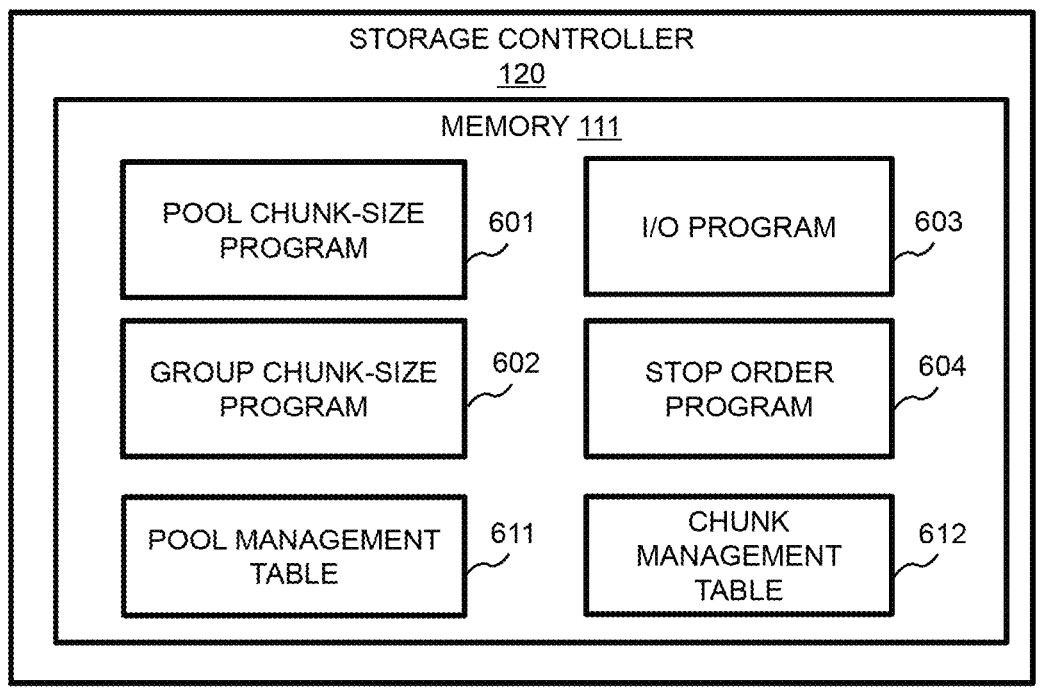
FIG. 6 illustrates an example of a program and a table stored in a memory of a storage controller.

FIG. 6 illustrates an example programs and tables stored in the memory 111 of the storage controller 120.

The memory 111 stores a pool chunk-size program 601 that determines sizes of chunks for each virtual pool 450, a group chunk-size program 602 that determines sizes of chunks for each RAID group 400, a stop order program 604 that transmits a stop order of a data movement process such as a reclamation process, and an I/O program 603 that controls input/output of data. In addition, the memory 111 stores a pool management table 611 that retains information related to the virtual pool 450 and a chunk management table 612 that retains information related to the chunk 130.

Figure 7:
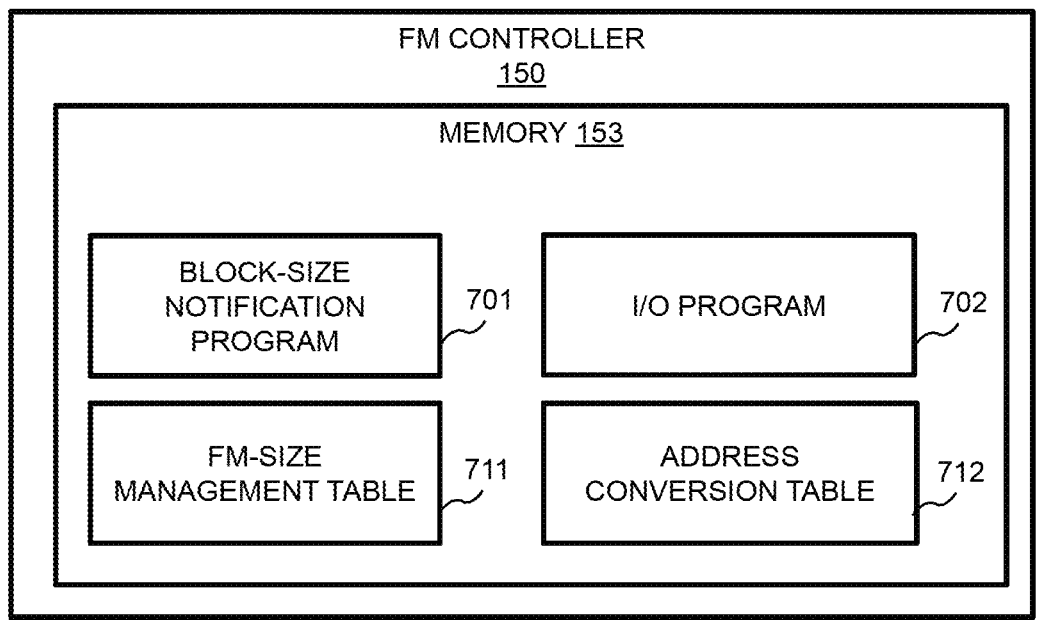
FIG. 7 illustrates an example of a program and a table stored in a memory of an FM controller.

FIG. 7 illustrates an example of programs and tables stored in the memory 153 of the FM controller 150.

The memory 153 stores a block-size notification program 701 that notifies the physical-block size and an I/O program 702 that performs input/output of data including conversion between a logical address and a physical address based on an address conversion table 712. In addition, the memory 153 stores an FM-size management table 711 that retains information related to the size of the FM 155 and an address conversion table 712 that retains information indicating the correlation between the logical address and the physical address.

FIG. 8 illustrates a configuration of the pool management table 611.

The pool management table 611 has an entry for each chunk 130, for example. Each entry stores information of a pool #801, an RG #802, a chunk #803, a status 804, and an allocation destination 805. Hereinafter, a single chunk 130 will be taken as an example ("target chunk 130" in the description of FIG. 8).

The pool #801 indicates an identification number of the virtual pool 450 including the target chunk. The RG #802 indicates an identification number of the RAID group 400 that is the basis of the target chunk ("RG" is an abbreviation for RAID group). The chunk #803 indicates an identification number of the target chunk 130.

The status 804 indicates a status of the target chunk. Herein, the term "valid" means that the target chunk 130 is a chunk including the latest data, the term "invalid" means that the target chunk 130 is an invalidated chunk, and the term "vacant" means that the target chunk 130 is a vacant chunk.

The allocation destination 805 is information indicating an allocation destination of the target chunk 130 (for example, a combination of VOL # (identification number of the logical volume 460) and LBA (LBA of the logical volume 460)). When the status 804 of the target chunk 130 is "invalid" or "vacant", the target chunk 130 is hardly allocated to the logical volume 460.

FIG. 9 illustrates a configuration of the chunk management table 612.

The chunk management table 612 has an entry for each RAID group 400, for example. Each entry stores information of an RG #901, a pool #902, a drive #903, a block size (represented as "BS") 904, an Lcm_B 905, the number of drives (represented as "n") 906, a chunk-size coefficient (represented as "α") 907, a chunk size (represented as "CS") 908, a physical capacity (represented as "PS") 909, and the number of chunks (represented as "c") 910. Hereinafter, a single RAID group 400 will be taken as an example ("target RAID group 400" in the description of FIG. 9).

The RG #901 indicates an identification number of the target RAID group 400. The pool #902 indicates an identification number of the virtual pool 450 to which the target RAID group 400 belongs.

The drive #903 indicates an identification number of each of the plurality of FM drives 180F included in the target RAID group 400.

The block size 904 indicates a size of a physical block corresponding to the FM drive 180F for each of the plurality of FM drives 180F included in the target RAID group 400.

The Lcm_B 905 indicates the least common multiple of sizes of the plurality of physical blocks respectively corresponding to the plurality of FM drives 180F included in the target RAID group 400.

The number of drives 906 indicates the number of FM drives 180F belonging to the virtual pool 450 to which the target RAID group 400 belongs.

The chunk-size coefficient 907 indicates a coefficient used to determine a chunk size for the virtual pool 450 to which the target RAID group 400 belongs.

The chunk size 908 indicates a chunk size determined for the virtual pool 450 to which the target RAID group 400 belongs.

The physical capacity 909 indicates a physical capacity of the FM drive 180F for each of the plurality of FM drives 180F included in the target RAID group 400.

The number of chunks 910 indicates the number of chunks 130 included in the storage area 140 based on the target RAID group 400.

FIG. 10 illustrates a configuration of the FM-size management table 711.

The FM-size management table 711 stores a physical-block size (represented as "BS") 1001 that is information indicating the physical-block size, a physical capacity (represented as "PS") 1002 that is information indicating the physical capacity (capacity of the physical area 220), and a logical capacity (represented as "LS") 1003 that is information indicating the logical capacity (capacity of the logical area 210).

In the example of FIG. 10, the logical capacity (6 TB) is a value obtained by subtracting the spare capacity (4 TB) from the physical capacity (10 TB). This is because the FM drive 180F retaining the table 711 has a function of opening the spare capacity (spare area), but includes the spare area to also make it applicable to a higher-level system that does not have a function as in the storage controller 120 according to the present embodiment (that is, to improve versatility). In the present embodiment, for example, the stop order program 603 transmits an inquiry (open order) of the physical capacity including the spare capacity of the FM drive 180F to the FM drive 180F, and the FM drive 180F (FM controller 150) replies to the stop order program 603 (that is, opens the spare capacity (spare area)) with the physical capacity "10 TB" (identical to the logical capacity) including the spare capacity in response to the inquiry.

In the present embodiment, the FM drive 180F including no spare capacity may be employed. In FIG. 10, specifically, the FM drive 180F may be employed in which the physical capacity 1002 and the logical capacity 1003 have the same value.

Figure 11:
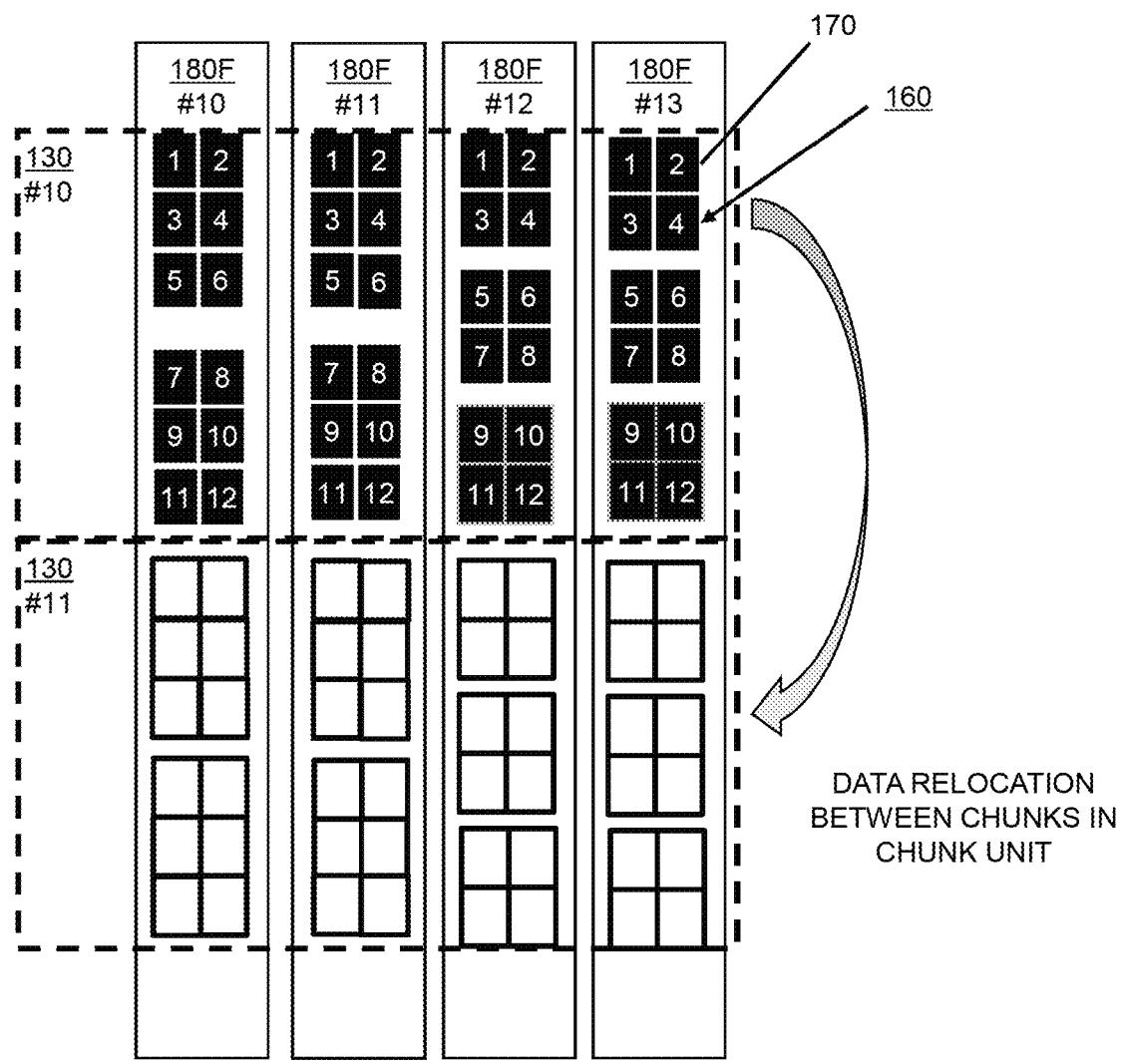
FIG. 11 illustrates an example of data relocation between chunks performed as the update on the storage area and an example of a relation between chunks and physical blocks.

FIG. 11 illustrates an example of data relocation between the chunks 130 performed as an update on the storage area 140 and an example of a relation between the chunk 130 and the physical block 160.

Hereinafter, for simplification of description, it is assumed that the physical-page size is the same in all the FM drives 180F, and therefore the physical-block size depends on the number of physical pages 170 included in the physical block 160. In FIG. 11 (and FIG. 12, FIG. 13, and FIGS. 17 to 19), a relatively larger boundary between the physical pages 170 indicates a boundary between the physical blocks 160. Therefore, according to the example of FIG. 11, the physical-block size of each of the FM drives 180E-10 and the 180E-11 is "6" (six physical pages), and the physical-block size of each of the FM drives 180E-12 and 180E-13 is "4" (four physical pages).

The number in the physical page 170 corresponds to the LBA (LBA of the area to which the chunk 130 is allocated (area in the logical volume 460)) in the chunk 130. In FIG. 11, the data corresponding to the LBA "1" of the chunk 130-10 is written to the FM drives 180E-10 to 180E-13 forming the RAID group 400.

In FIG. 11, when any of the data written to the chunk 130-10 is updated, the I/O program 604 reads data from chunk 130-10, updates the read data, and writes the updated data to the top vacant chunk 130-11 (data relocation between the chunks 130 in units of chunks).

The chunk size is optimized based on four physical-block sizes respectively corresponding to the FM drives 180E-10 to 180E-13. Specifically, since the chunk size is α times (α is a coefficient and a natural number, herein α=1) the product of "12", which is the least common multiple of the physical-block sizes "4" and "6", and the number "4" of the FM drive 180F, the chunk size is "48". Since the chunk size is determined in this way, each chunk 130 does not share the physical block 160 with another chunk 130. Therefore, for each chunk 130, valid data and invalid data are not mixed in each physical block on which the chunk 130 is based, and accordingly the reclamation process can be eliminated.

Since the chunk size is determined based on the plurality of physical-block sizes respectively corresponding to the plurality of FM drives 180F, in the present embodiment, each of the plurality of FM drives 180F includes a block-size notification program 701 as an interface that provides the physical-block size to the higher-level system, and the storage controller 120 includes a pool chunk-size program 601 and a group chunk-size program 602 which will be described below. When no virtual pool 450 exists, the pool chunk-size program 601 may not be provided. In addition, a drive group (a plurality of FM drives 180F) different from the RAID group 400 may be provided, and the group chunk-size program 602 can determine a chunk size for such a drive group.

The plurality of physical-block sizes respectively corresponding to the plurality of FM drives 180F may be managed by the management system 103, for example, and the physical-block size may be notified from the management system 103 to the storage controller 120 instead of the FM drive 180F. Further, the management system 103 may determine the chunk size based on the plurality of physical-block sizes respectively corresponding to the plurality of FM drives 180F, and notify the storage controller 120 of the determined chunk size.

Figure 12:
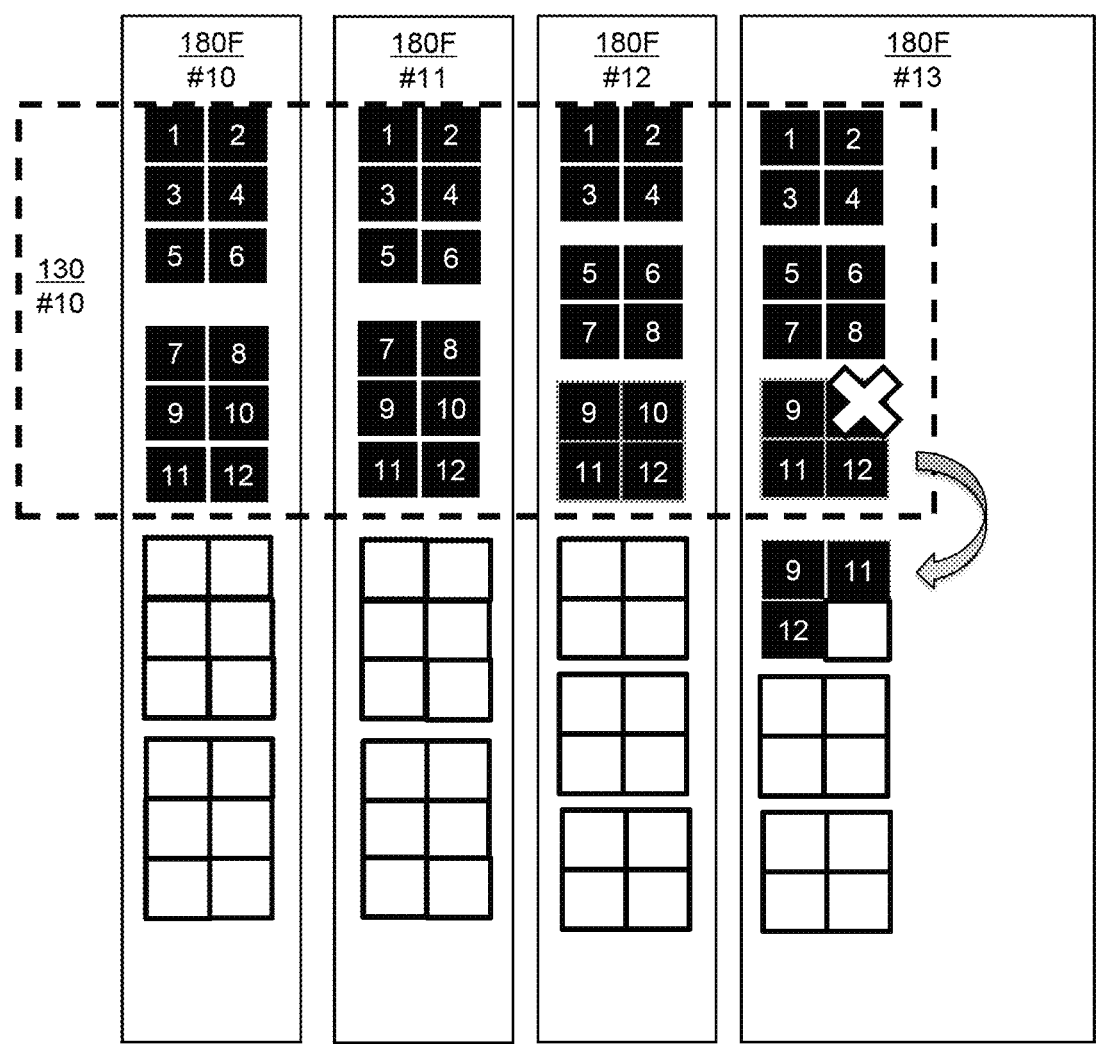
FIG. 12 illustrates an example of a problem which is solved by the first embodiment.

As described above, according to the present embodiment, the reclamation process is not necessary in each of the FM drives 180F, but the reclamation process is an example of a data movement process between the physical blocks 160. As another example of the data movement process, for example, as illustrated in FIG. 12, when a read error (data can hardly be read even if read retry is performed a predetermined number of times) occurs in a certain physical page 170, a process of moving data from the remaining physical page 170 to a physical block 160 different from the physical block 160 including the physical page 170 may run.

In addition, a refresh process may run. The refresh process is a process performed due to data retention characteristics of FM, and is a process of periodically moving data from the physical block (after error correction) to another physical block so as to retain data in such a manner that error correction is possible.

When such a data movement process is performed, a part of data in a certain chunk exists in another chunk, and I/O in units of chunks cannot be maintained.

Figure 13:
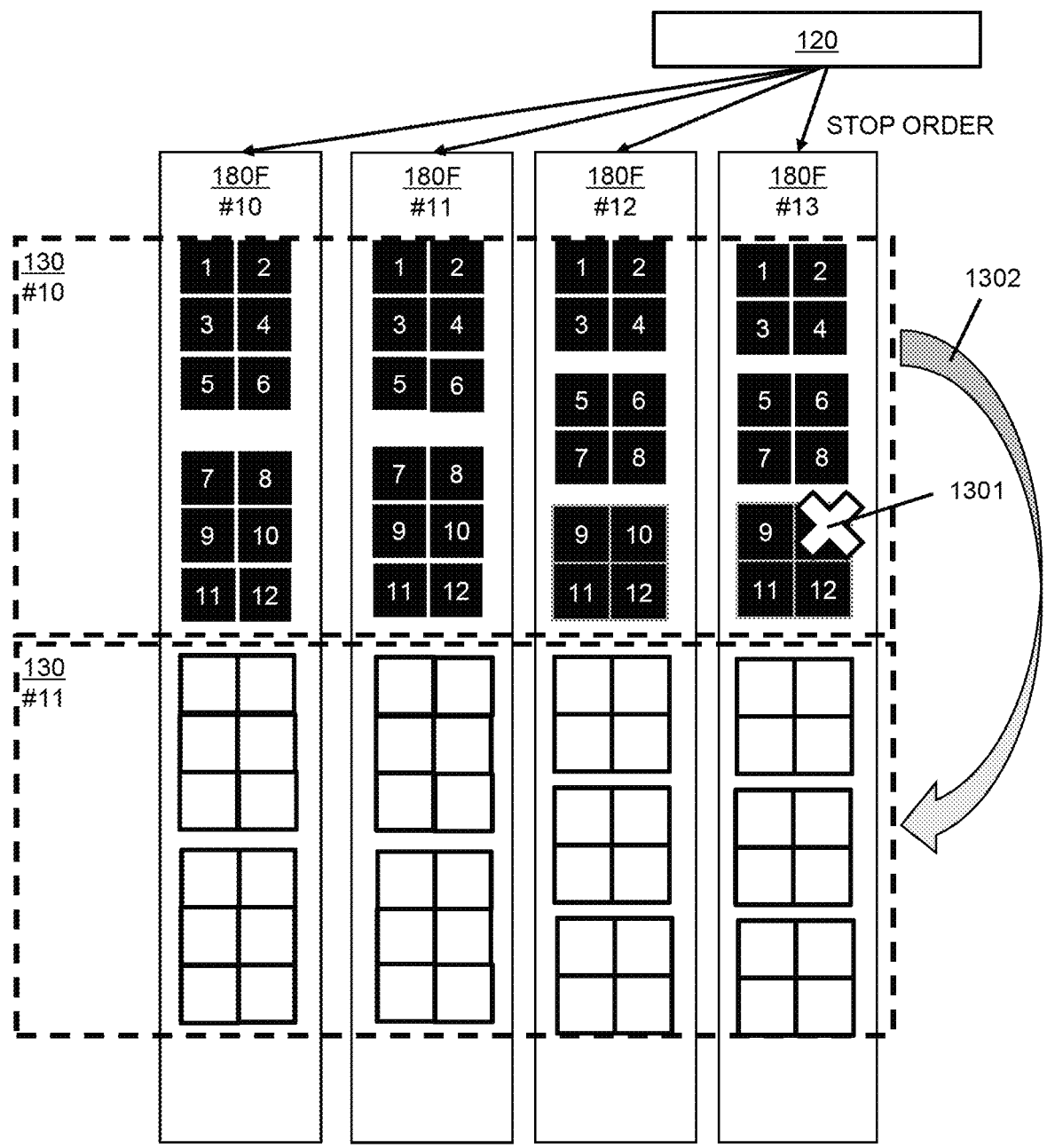
FIG. 13 illustrates an example of data restoration performed in the first embodiment.

In the present embodiment, as illustrated in FIG. 13, the storage controller 120 transmits a stop order, which is an order to stop (inhibit) all data movement processes between the physical blocks 160, to each of the FM drives 180F.

Specifically, for example, the storage controller 120 executes the stop order program 603 described above. The stop order program 603 transmits the stop order to each of the FM drives 180F. In response to the stop order, the I/O program 702 of the FM drive 180F does not perform all data movement processes between the physical blocks 160 without being limited to the reclamation process. Thus, I/O in units of chunk can be maintained. In addition, since the data movement process is not performed in the FM drive 180F, improvement in I/O performance of the storage system 100 as a whole can be expected.

When the data movement process between the physical blocks 160 such as a refresh process is completely stopped, correction of some data using ECC (Error Correcting Code) is not possible, that is, an uncorrectable error may occur (see reference numeral 1301). In the present embodiment, however, since each chunk 130 is based on any of RAID groups 400, when an uncorrectable error occurs in some of data that is subjected to data relocation between the chunks 130 (that is, when data read from any FM drive 180F is missing), the I/O program 604 restores some of data (missing data) using a parity during the data relocation (see reference numeral 1302).

A process of determining the chunk size will be described below in detail.

Figure 14:
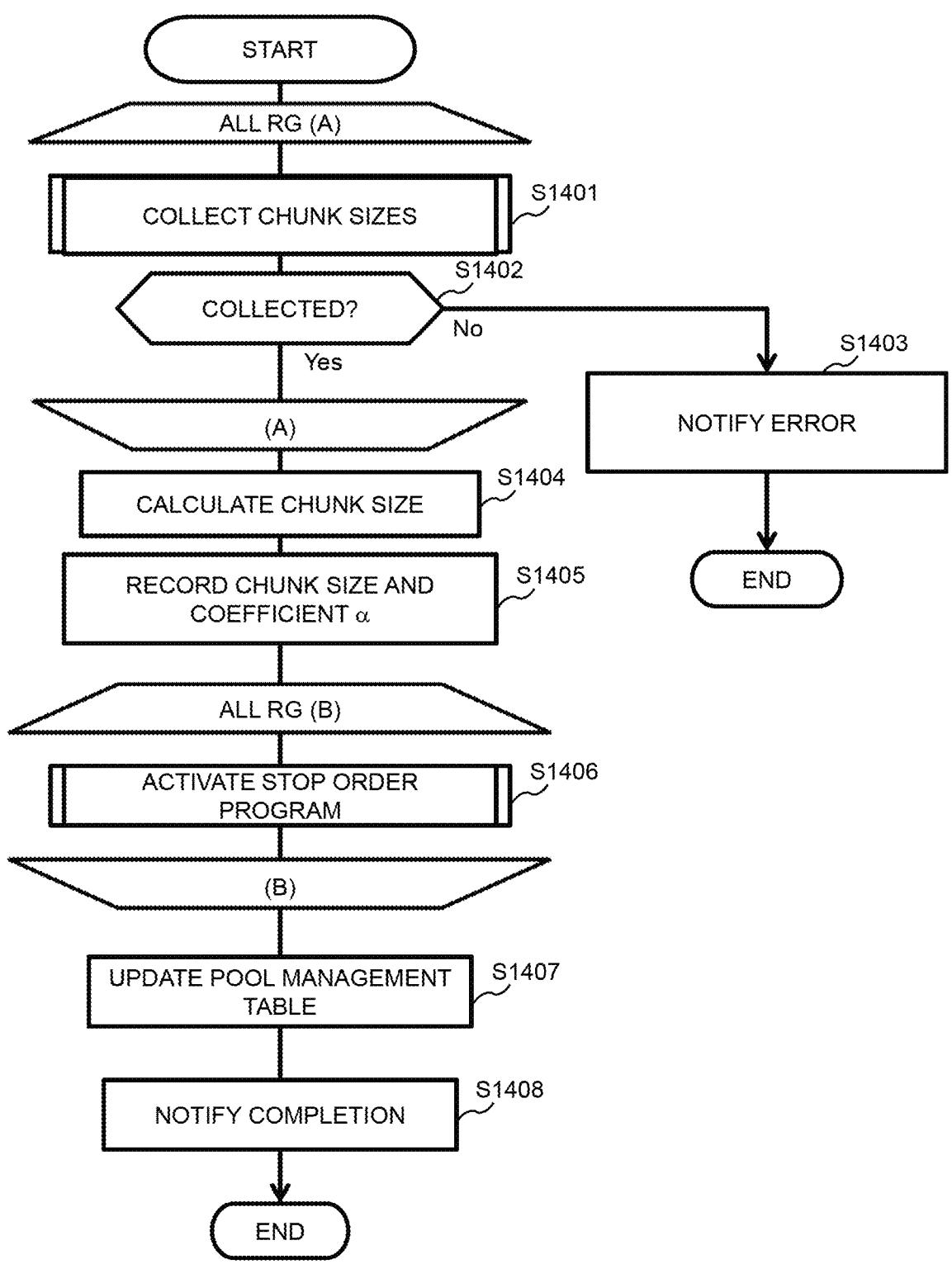
FIG. 14 is a flowchart of a process to be performed by a pool chunk-size program.

FIG. 14 illustrates a flowchart of a process to be performed by the pool chunk-size program 601. The pool chunk-size program 601 is activated, for example, when the virtual pool 450 is configured (for example, when a request to configure the virtual pool 450 receives from the management system 103). In the description of FIG. 14, the configured virtual pool 450 is referred to as a "target virtual pool 450".

The pool chunk-size program 601 activates the group chunk-size program 602 for each of the plurality of RAID groups 400 belonging to the target virtual pool 450 to collect the chunk size of the RAID group 400 (S1401). When the chunk size of at least one RAID group 400 is uncollectible (S1402: No), the pool chunk-size program 601 notifies the management system 103 of an error (S1403).

When the chunk size is collected for each of the RAID groups 400 belonging to the target virtual pool 450 (S1402: Yes), the pool chunk-size program 601 calculates a chunk size (=Lcm_R*m*α), that is, determines the product of Lcm_R, m, and α as the chunk size of the target virtual pool 450 (S1404). The "Lcm_R" indicates the least common multiple of the plurality of chunk sizes collected in step S1401 for each of the plurality of RAID groups 400 belonging to the target virtual pool 450. The indicates the number of RAID groups 400 belonging to the target virtual pool 450. The "α" is any natural number and is a coefficient.

The pool chunk-size program 601 records information of chunk size 908 (information indicating the chunk size determined in step S1404) and chunk-size coefficient 907 (value as the coefficient α used in step S1404) for the target virtual pool 450 in the chunk management table 612 (S1405).

The pool chunk-size program 601 activates the stop order program 603 for each of plurality of RAID groups 400 belonging to the target virtual pool 450 so that a data movement process is not performed in each of the FM drives 180F belonging to the RAID group 400 (S1406).

The pool chunk-size program 601 records, for the target virtual pool 450, a pool #801 (information indicating an identification number of the target virtual pool 450), a RG #802 (information indicating an identification number for each of the RAID group 400 belonging to the target virtual pool 450), a chunk #803 (information indicating an identification number of each chunk 130 for each of the RAID groups 400 belonging to the target virtual pool 450), a status 804 (information indicating a status ("vacant" in an early stage) of each chunk 130 for each of the RAID groups 400 belonging to the target virtual pool 450), and an allocation destination 805 (information indicating an allocation destination ("-" in an early stage) of each chunk 130 for each of the RAID groups 400 belonging to the target virtual pool 450), in the pool management table 611 (S1407).

The pool chunk-size program 601 notifies the management system 103 of the completion of the configuration of the target virtual pool 450 (S1408).

Figure 15:
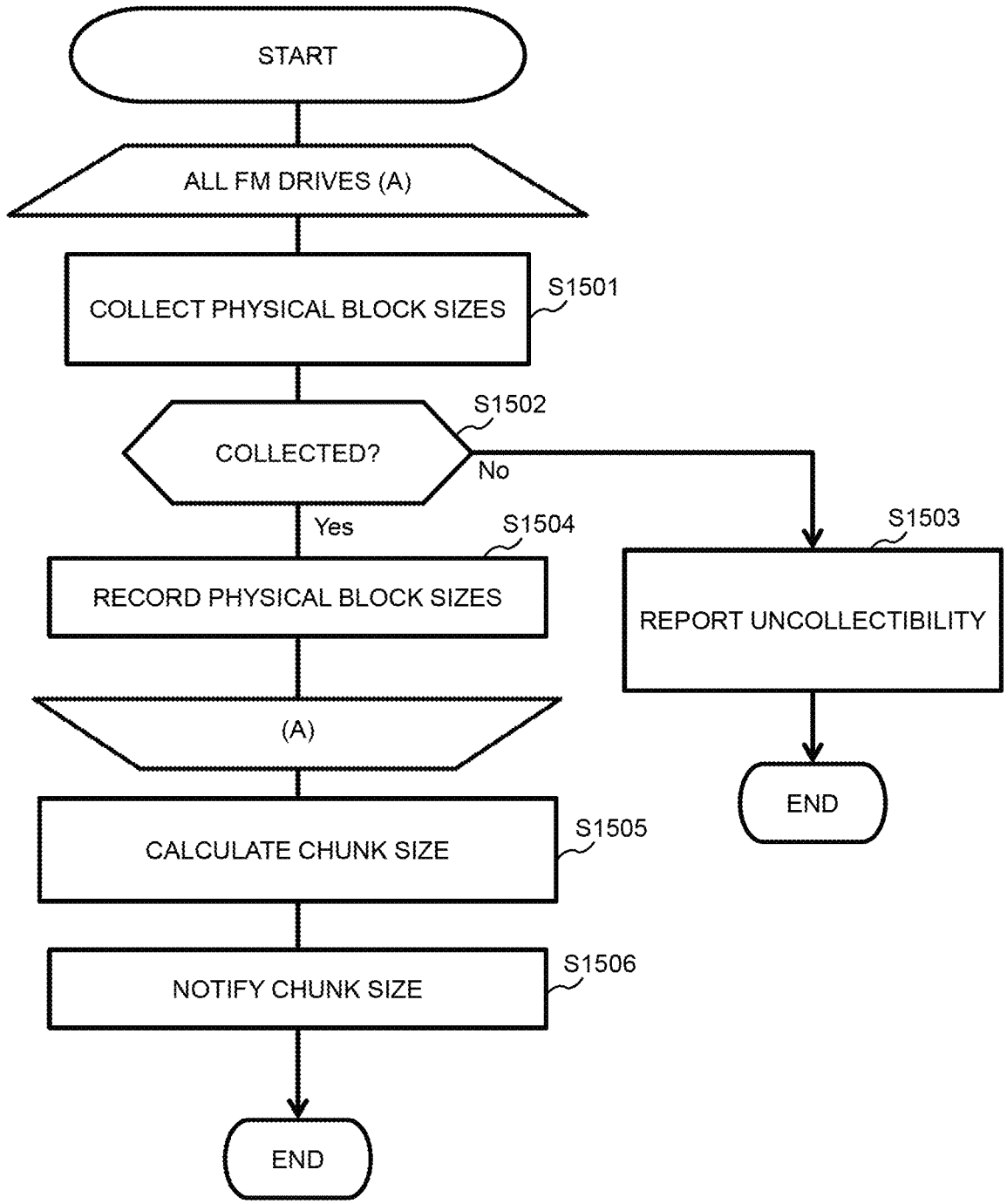
FIG. 15 is a flowchart of a process to be performed by a group chunk-size program.

FIG. 15 illustrates a flowchart of a process to be performed by the group chunk-size program 602. In the description of FIG. 15, a single RAID group 400 is taken as an example ("target RAID group 400" in the description of FIG. 15).

The group chunk-size program 602 performs the following steps for each of the plurality of FM drives 180F belonging to the target RAID group 400. A single FM drive 180F is taken as an example ("target FM drive 180F" in the description of FIG. 15).

The group chunk-size program 602 collects the physical-block size from the target FM drive 180F (S1501). Specifically, for example, the group chunk-size program 602 transmits a block size inquiry to the target FM drive 180F, and receives a response indicating physical-block size 1001, which is recorded in the FM-size management table 711 of the target FM drive 180F, from the block-size notification program 701 of the target FM drive 180F.

When the physical-block size is collected (S1502: Yes), the group chunk-size program 602 records, in the chunk management table 612, the block size 904 (information indicating the physical-block size collected in step S1501) for the target FM drive 180F belonging to the target RAID group 400 (S1504).

When the physical-block size is uncollectible for the target FM drive 180F (S1502: No), the group chunk-size program 602 reports uncollectibility of the chunk size to the pool chunk-size program 601 (S1503).

The group chunk-size program 602 calculates a chunk size (=Lcm_B*n), that is, determines the product of Lcm_B and n as a chunk size of the target RAID group 400 (S1505). The "Lcm_B" indicates the least common multiple of the plurality of physical-block sizes collected in step S1501 for each of the plurality of FM drives 180F belonging to the target RAID group 400. The "n" indicates the number of FM drives 180F belonging to the target RAID group 400.

The group chunk-size program 602 notifies the pool chunk-size program 601 of the chunk size determined in step S1505 for the target RAID group 400 (S1506).

Figure 16:
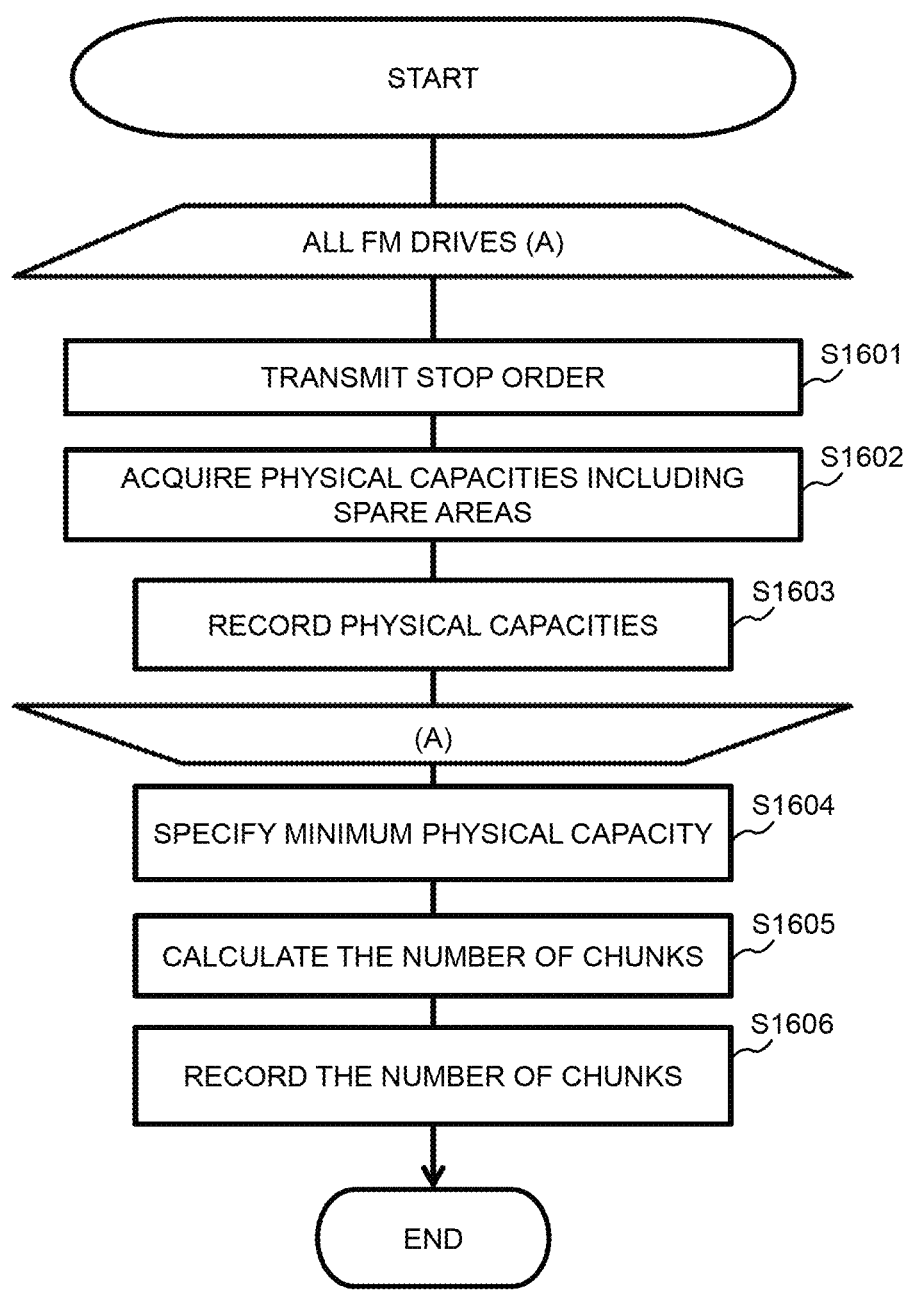
FIG. 16 is a flowchart of a process to be performed by a stop order program.

FIG. 16 illustrates a flowchart of a process to be performed by the stop order program 603. In the description of FIG. 16, a single RAID group 400 is taken as an example ("target RAID group 400" in the description of FIG. 16).

The stop order program 603 performs the following steps for each of the plurality of FM drives 180F belonging to the target RAID group 400. A single FM drive 180F is taken as an example ("target FM drive 180F" in the description of FIG. 16).

The stop order program 603 transmits a stop order of a data movement process (for example, reclamation process) to the target FM drive 180F (S1601). In response to the stop order, a data movement function of the target FM drive 180F (function of performing a data movement process between the physical blocks 160) is stopped.

The stop order program 603 acquires a logical capacity, specifically, a physical capacity including a spare capacity from the target FM drive 180F (S1602). Specifically, the stop order program 603 transmits an inquiry (open order) of the physical capacity including the spare capacity to the target FM drive 180F. In response to the inquiry, the target FM drive 180F replies to the stop order program 603 with the physical capacity including the spare capacity as the logical capacity.

The stop order program 603 records the physical capacity 909 (information indicating the physical capacity acquired in step S1602) for the target FM drive 180F in the chunk management table 612 (S1603).

The stop order program 603 specifies the minimum physical capacity among the plurality of physical capacities (logical capacities) respectively corresponding to the plurality of FM drives 180F belonging to the target RAID group 400 (S1604).

The stop order program 603 calculates the number of chunks (=(PSmin*n)/CSx), that is, calculates the number of chunks for the target RAID group 400 (S1605). The "PSmin" indicates the minimum physical capacity specified in step S1604. The "n" is the number of FM drives 180F belonging to the target RAID group 400. The "CSx" indicates the chunk size (chunk size indicated by the chunk size 908 in FIG. 10) determined for the virtual pool 450 to which the target RAID group 400 belongs.

The stop order program 603 records the number of chunks 910 (information indicating the number of chunks calculated in step S1605) for the target RAID group 400 in the chunk management table 612 (S1606).

The description with reference to FIGS. 14 to 16 can be summarized as follows, for example.

The storage controller 120 performs processes of the following (a) to (c):
  (a) a process of collecting the plurality of physical-block sizes from the plurality of FM drives 180F, respectively;
  (b) a process of determining the chunk size based on the plurality of collected physical-block sizes; and
  (c) a process of determining the number of chunks based on the minimum logical capacity among the plurality of logical capacities (for example, physical capacities including the spare capacity) respectively corresponding to the plurality of FM drives 180F, the number of FM drives 180F, and the determined chunk size.

Here, since the plurality of RAID groups 400 (RAID group 400 is an example of the drive group) belong to the same virtual pool 450 (an example of the pool), the following is adopted.
  For each of the plurality of RAID groups 400, the above processes (a) to (c) are performed.
  For each of the plurality of RAID groups 400, the chunk size determined in the process (c) is a chunk size determined for the virtual pool 450 based on the plurality of chunk sizes respectively determined for the plurality of RAID groups 400.

Second Embodiment

A second embodiment will be described. In the description, differences from the first embodiment will be mainly described, and the configuration identical to that in the first embodiment will not be presented or be briefly described.

Figure 17:
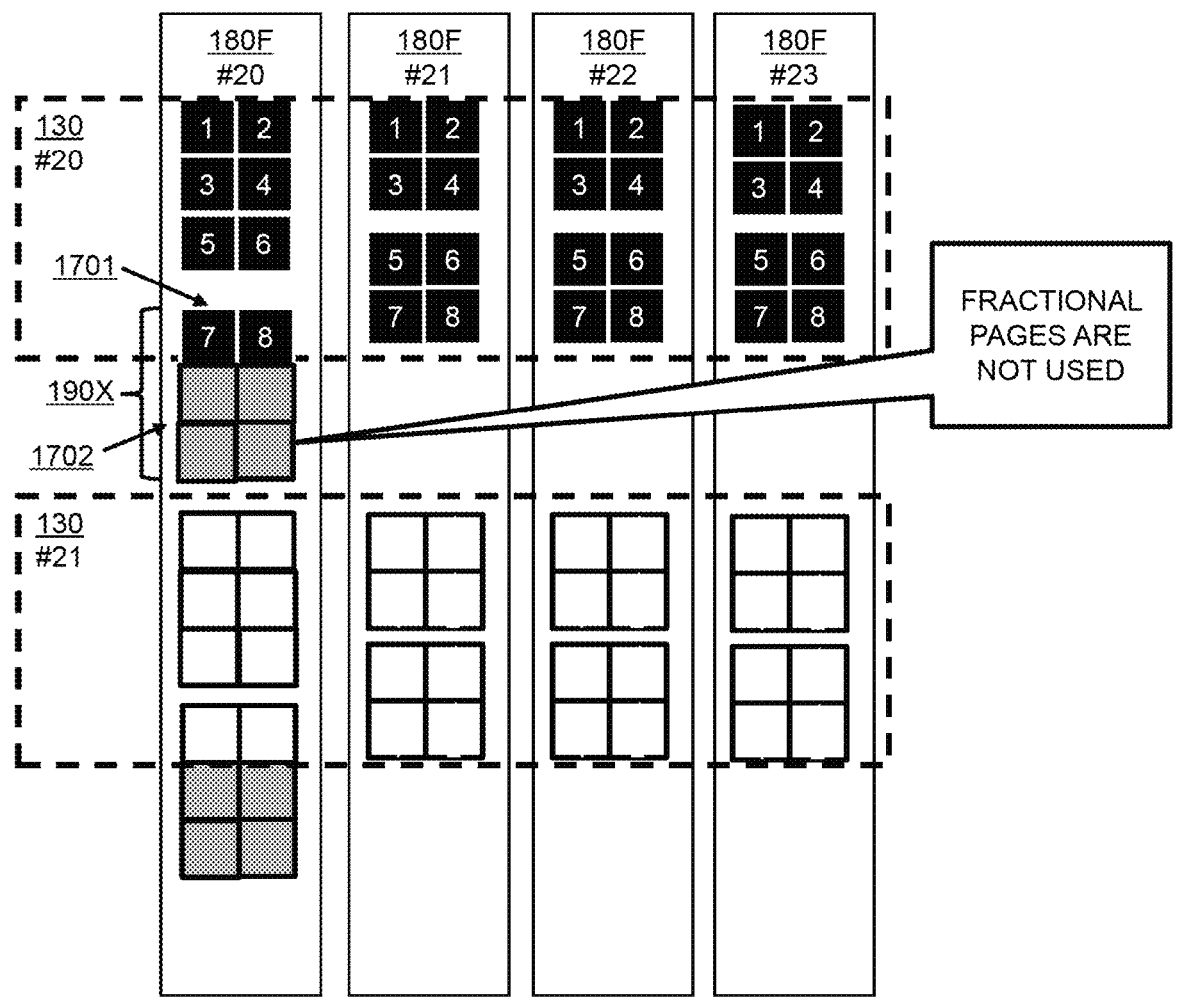
FIG. 17 illustrates an example of a relation between chunks and physical blocks in a second embodiment.

FIG. 17 illustrates an example a relation between a chunk 130 and a physical block 160 in the second embodiment.

Similarly to the first embodiment, according to the second embodiment, a chunk size is based on a plurality of physical-block sizes respectively corresponding to a plurality of FM drives 180F. However, it is not necessary to strictly follow the least common multiple of the plurality of physical-block sizes respectively corresponding to the plurality of FM drives 180F for the determination of the chunk size for the RAID group 400, and as a result, the chunk size is higher in flexibility than that in the first embodiment.

Specifically, a logical block 190X including only a part 1701 (for example, a part of logical page) in any chunk 130-20 is allowed, and the remaining part 1702 (for example, the remaining logical pages) of the logical block 190X is not included in any chunk 130 forming the storage area 140 (in other words, a plurality of chunks 130 is formed so that two or more chunks 130 do not share the same logical block 190). The physical page 170, which is the basis of the remaining part 1702, is a fractional page, and the remaining part 1702 is not included in any chunk 130 forming the storage area 140. Accordingly, data is not stored in the fractional page. As a result, even when flexibility of the chunk size is increased, it can be maintained that there is no need for the reclamation process.

In the present embodiment, for example, when a chunk size satisfying a predetermined condition (for example, a chunk size equal to or smaller than a chunk-size upper limit) is obtained for the RAID group 400, the least common multiple of the plurality of physical-block sizes respectively corresponding to the plurality of FM drives 180F belonging to the RAID group 400 may be adopted. Specifically, for example, the following may be performed.

The storage controller 120 determines whether a chunk size satisfying a predetermined condition can be obtained even when the least common multiple of the plurality of physical-block sizes is adopted.

When the result of the determination is true, the storage controller 120 determines a chunk size based on the least common multiple (for example, chunk size=(the least common multiple)*(the number of FM drives 180F belonging to the RAID group 400)*coefficient β (β is any natural number)).

When the result of the determination is false, the storage controller 120 determines a chunk size based on the least common multiple of as many physical-block sizes as possible out of the plurality of physical-block sizes (for example, chunk size=(the least common multiple of as many physical-block sizes as possible)*(the number of FM drives 180F belonging to the RAID group 400)*coefficient β), and the remaining parts of the logical blocks only partially included in any chunk are not also included in any chunk 130 forming the storage area 140.

Third Embodiment

A third embodiment will be described. In the description, differences from at least one of the first and second embodiments will be mainly described, and the configuration identical to that in at least one of the first and second embodiments will not be presented or be briefly described.

Figure 18:
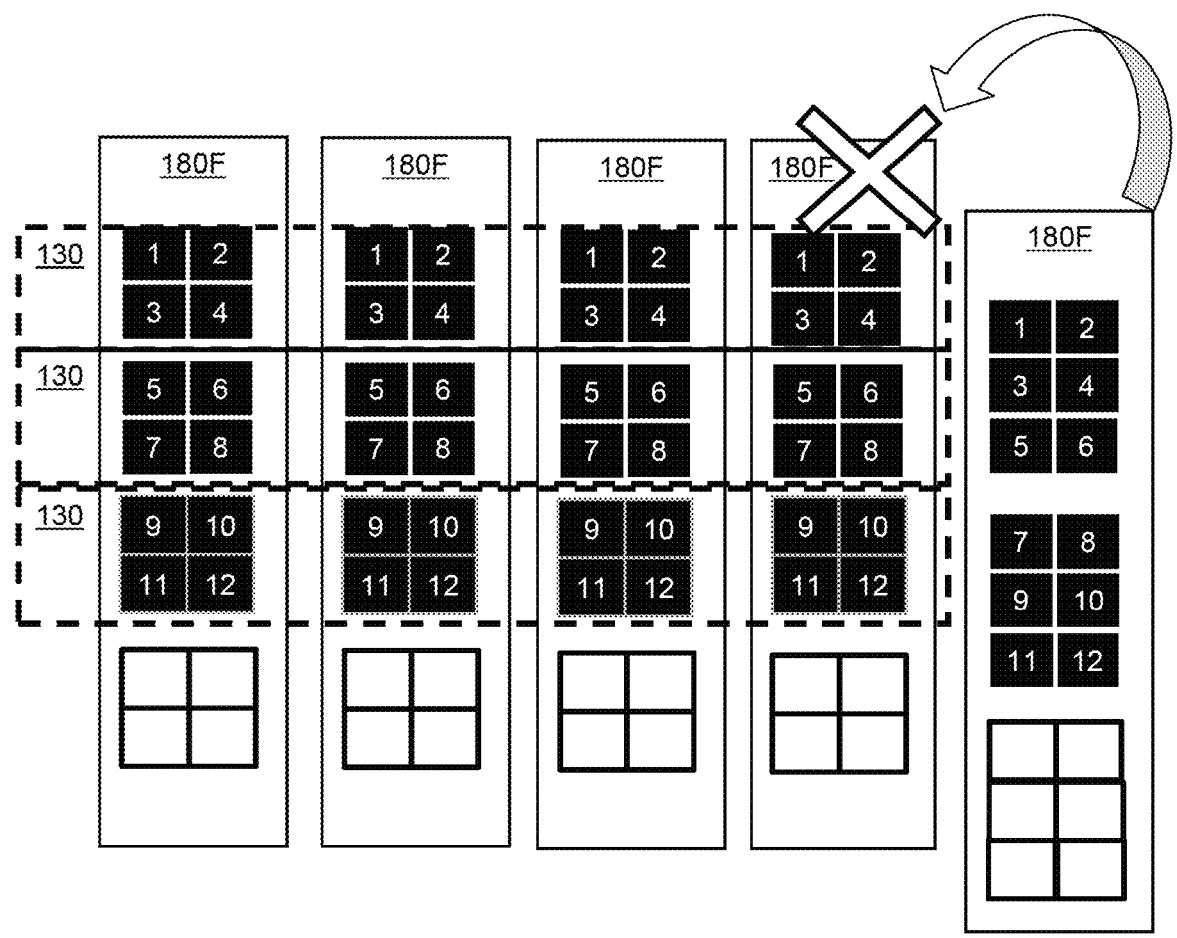
FIG. 18 illustrates an example of chunk-size management in a third embodiment.

FIG. 18 illustrates an example of a chunk size management in the third embodiment.

After a chunk size is determined for an RAID group 400, at least one FM drive 180F may be replaced in the RAID group 400. When a physical-block size of the FM drive 180F after replacement is identical to a physical-block size of the FM drive 180F before replacement, a current chunk size can be maintained for the RAID group 400. However, when the physical-block sizes before and after replacement are different from each other, the current chunk size may not be maintained.

In the present embodiment, accordingly, when at least one FM drive 180F is replaced in the RAID group 400, a storage controller 120 performs as follows.

The storage controller 120 determines whether the physical-block size of the FM drive 180F after replacement is different from the physical-block size of the FM drive 180F before replacement and a relation between Lcm_B (the least common multiple of a plurality of physical-block sizes respectively corresponding to a plurality of FM drives 180F belonging to the RAID group 400) before replacement and Lcm_B after replacement satisfies a predetermined condition (for example, Lcm_B before replacement is a multiple of Lcm_B after replacement) under which the current chunk size of the RAID group 400 is maintained.

When the result of the determination is true, the storage controller 120 maintains the current chunk size even when the FM drive 180F is replaced.

When the result of the determination is false, the storage controller 120 permits the replacement (for example, after the replacement) to change the chunk size (for example, perform the processes of FIGS. 14 to 16), or refuses the replacement (for example, the refusal of replacement is notified by, for example, voice or LED lighting, or the refusal of replacement is notified to a management system 103).

In addition, after the chunk size is determined for the virtual pool 450, at least one RAID group 400 may be replaced or added for the virtual pool 450. When the chunk size of the RAID group 400 after replacement or addition is identical to a chunk size of the RAID group 400 before replacement or a chunk size of any of the existing RAID groups 400, a current chunk size can be maintained for the virtual pool 450. However, when the chunk sizes before and after replacement or addition are different from each other, the current chunk size may not be maintained.

In the present embodiment, accordingly, when at least one RAID group 400 is replaced or added for the virtual pool 450, a storage controller 120 performs as follows.

The storage controller 120 determines whether the chunk size determined for the RAID group 400 after replacement or addition is different from the chunk size determined for the RAID group 400 before replacement or the existing RAID group 400 and a relation between Lcm_R (the least common multiple of the plurality of chunk sizes respectively collected in step S1401 for the plurality of RAID groups 400 belonging to the virtual pool 450) before replacement or addition and Lcm_R after replacement satisfies a predetermined condition (for example, Lcm_R before replacement is a multiple of Lcm_R after replacement) under which the current chunk size of the virtual pool 450 is maintained.

When the result of the determination is true, the storage controller 120 maintains the current chunk size for the virtual pool 450 even when the RAID group 400 is replaced or added.

When the result of the determination is false, the storage controller 120 permits the replacement or addition (for example, after the replacement or addition) to change the chunk size for the virtual pool 450 (for example, perform the processes of FIGS. 14 to 16), or refuses the replacement or addition (for example, the refusal of replacement or addition is notified by, for example, voice or LED lighting, or the refusal of replacement or addition is notified to a management system 103).

As described above, when at least one FM drive 180F of the plurality of FM drives 180F is replaced with an FM drive 180F having a physical-block size different from the physical-block size of the FM drive 180F or at least one or more FM drives 180F are added newly, the storage controller 120 performs as follows.

The storage controller 120 determines whether to maintain the current chunk size.

When the result of the determination is false, the storage controller 120 permits the replacement or the addition to change the chunk size, or refuses the replacement or the addition.

While some embodiments have been described above, these are merely examples for explaining the present invention, and not intended to limit the scope of the present invention only to these embodiments. The present invention can be implemented in other various forms.

For example, a higher-level system other than the storage controller 120, for example, a computer such as the host system 102 may be employed as a higher-level system of the FM drive 180F.

In addition, a distributed system (for example, a system as a redundant configuration group) may be employed which is formed by a plurality of nodes including a plurality of FM drives 180F. The higher-level system may be a system (for example, a function) mounted on at least one of the plurality of nodes. Examples of redundant configurations may include Erasure Coding, RAIN (Redundant Array of Independent Nodes), inter-node mirroring, and RAID (Redundant Array of Independent (or Inexpensive) Disks) in which a node is regarded as one drive.

What is claimed is:

1. A system comprising:
   one or more NVM (Non-Volatile Memory) drives; and
   a higher-level system that inputs and outputs data to/from a storage area including one or more logical areas respectively provided from the one or more NVM drives, wherein
   each of the one or more NVM drives includes an NVM having a plurality of physical blocks that serve as units of data erasure, respectively,
   a logical capacity, which is a capacity of a logical area provided from the NVM drive for each of the one or more NVM drives, is based on a physical capacity which is a capacity of a physical area based on a plurality of physical blocks in an NVM of the NVM drive,
   the higher-level system manages a plurality of chunks that are a plurality of areas forming the storage area, each of the chunks being a unit of data input/output and being a non-overwritable area,
   each of the plurality of chunks has the same chunk size,
   each of the plurality of chunks includes a part of each of the one or more logical areas, and
   each of the plurality of chunks includes, for each of the one or more NVM drives, all or part of one or more logical blocks that are one or more ranges corresponding to one or more physical blocks, respectively, but does not include at least a part of a logical block that is entirely or partially included in any another chunk,
   wherein
   the one or more NVM drives are a plurality of NVM drives, and
   the chunk size is based on a plurality of physical-block sizes respectively corresponding to the plurality of NVM drives, and
   wherein
   data does not move between the physical blocks in each of the plurality of NVM drives.

2. The system according to claim 1, wherein
   the plurality of NVM drives forms an RAID (Redundant Array of Independent (or Inexpensive) Disks) group.

3. A system comprising:
   one or more NVM (Non-Volatile Memory) drives; and
   a higher-level system that inputs and outputs data to/from a storage area including one or more logical areas respectively provided from the one or more NVM drives, wherein
   each of the one or more NVM drives includes an NVM having a plurality of physical blocks that serve as units of data erasure, respectively,
   a logical capacity, which is a capacity of a logical area provided from the NVM drive for each of the one or more NVM drives, is based on a physical capacity which is a capacity of a physical area based on a plurality of physical blocks in an NVM of the NVM drive,
   the higher-level system manages a plurality of chunks that are a plurality of areas forming the storage area, each of the chunks being a unit of data input/output and being a non-overwritable area,
   each of the plurality of chunks has the same chunk size,
   each of the plurality of chunks includes a part of each of the one or more logical areas, and
   each of the plurality of chunks includes, for each of the one or more NVM drives, all or part of one or more logical blocks that are one or more ranges corresponding to one or more physical blocks, respectively, but does not include at least a part of a logical block that is entirely or partially included in any another chunk,
   wherein
   the one or more NVM drives are a plurality of NVM drives, and
   the chunk size is based on a plurality of physical-block sizes respectively corresponding to the plurality of NVM drives, and
   wherein
   the higher-level system is configured to:
   determine whether to obtain a chunk size satisfying a predetermined condition even when the least common multiple of the plurality of physical-block sizes is adopted;
   determine a chunk size based on the least common multiple, when the result of the determination is true; and
   determine a chunk size based on the least common multiple of as many physical-block sizes as possible out of the plurality of physical-block sizes and hardly include the remaining parts of the logical blocks only partially included in any chunk forming the storage area, when the result of the determination is false.

4. A system comprising:
   one or more NVM (Non-Volatile Memory) drives; and
   a higher-level system that inputs and outputs data to/from a storage area including one or more logical areas respectively provided from the one or more NVM drives, wherein
   each of the one or more NVM drives includes an NVM having a plurality of physical blocks that serve as units of data erasure, respectively,
   a logical capacity, which is a capacity of a logical area provided from the NVM drive for each of the one or more NVM drives, is based on a physical capacity which is a capacity of a physical area based on a plurality of physical blocks in an NVM of the NVM drive, the higher-level system manages a plurality of chunks that are a plurality of areas forming the storage area, each of the chunks being a unit of data input/output and being a non-overwritable area, each of the plurality of chunks has the same chunk size, each of the plurality of chunks includes a part of each of the one or more logical areas, and each of the plurality of chunks includes, for each of the one or more NVM drives, all or part of one or more logical blocks that are one or more ranges corresponding to one or more physical blocks, respectively, but does not include at least a part of a logical block that is entirely or partially included in any another chunk, wherein the one or more NVM drives are a plurality of NVM drives, and the chunk size is based on a plurality of physical-block sizes respectively corresponding to the plurality of NVM drives, and wherein when at least one NVM drive of the plurality of NVM drives is replaced with an NVM drive having a physical-block size different from the physical-block size of the NVM drive or at least one or more NVM drives are added newly, the higher-level system is configured to:

determine whether to maintain the chunk size; and permit the replacement or the addition to change the chunk size when the result of the determination is false, or refuse the replacement or the addition.

* * * * *